United States Patent
Endo et al.

(10) Patent No.: US 8,319,786 B2
(45) Date of Patent: Nov. 27, 2012

(54) IMAGE PROCESSING DEVICE, CONTROL METHOD FOR IMAGE PROCESSING DEVICE AND INFORMATION RECORDING MEDIUM

(75) Inventors: Masashi Endo, Minato-ku (JP); Toru Nagai, Minato-ku (JP); Eiji Suzuki, Minato-ku (JP); Tadaaki Tsunashima, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 925 days.

(21) Appl. No.: 12/441,655

(22) PCT Filed: Aug. 29, 2007

(86) PCT No.: PCT/JP2007/066741
§ 371 (c)(1),
(2), (4) Date: Mar. 17, 2009

(87) PCT Pub. No.: WO2008/035549
PCT Pub. Date: Mar. 27, 2008

(65) Prior Publication Data
US 2010/0020079 A1 Jan. 28, 2010

(30) Foreign Application Priority Data
Sep. 21, 2006 (JP) ................. 2006-255458

(51) Int. Cl.
*G09G 5/00* (2006.01)
(52) U.S. Cl. ............... 345/584; 345/426; 345/582
(58) Field of Classification Search ........... 345/426, 345/582–588
See application file for complete search history.

(56) References Cited

U.S. PATENT DOCUMENTS

| 5,786,822 A | 7/1998 | Sakaibara et al. |
| 6,525,740 B1 | 2/2003 | Cosman |

(Continued)

FOREIGN PATENT DOCUMENTS

JP 7254072 A 10/1995

(Continued)

OTHER PUBLICATIONS

Search Report for Taiwanese Patent Application No. 096134175, dated Nov. 30, 2010.

(Continued)

*Primary Examiner* — Xiao M. Wu
*Assistant Examiner* — Charles Tseng
(74) *Attorney, Agent, or Firm* — Sughrue Mion, PLLC

(57) ABSTRACT

To provide an image processing device capable of attaining shade expression on a surface of an object while reducing image processing load, and of reducing a sense of discomfort which the user may feel. A shading process execution unit (62) executes a shading process on the surface of the object, based on a pseudo-normal vector for each pixel of a texture image to be mapped onto the surface of the object. A shading process execution restraining unit (66) restrains execution of the shading process by the shading process execution unit (62), based on the distance from a viewpoint to the object. A pseudo-normal vector obtaining unit (60) stores information correlating the distance from the viewpoint with pseudo-normal vector information for obtaining a pseudo-normal vector of each pixel. Then, the pseudo-normal vector obtaining unit (60) obtains a pseudo-normal vector of each pixel, based on the pseudo-normal vector information correlated to the distance from the viewpoint to the object.

8 Claims, 7 Drawing Sheets

U.S. PATENT DOCUMENTS

| | | |
|---|---|---|
| 6,595,851 B1 | 7/2003 | Kubo et al. |
| 7,256,781 B2 * | 8/2007 | Shioya .......................... 345/426 |
| 7,692,662 B2 * | 4/2010 | Ohba ............................. 345/584 |
| 7,786,993 B2 * | 8/2010 | Cerny et al. ................... 345/426 |
| 2002/0022517 A1 | 2/2002 | Tokuyama et al. |
| 2005/0049047 A1 | 3/2005 | Kitao |
| 2005/0068313 A1 | 3/2005 | Morimitsu et al. |
| 2006/0146063 A1 * | 7/2006 | Ohba ............................. 345/584 |
| 2006/0170681 A1 | 8/2006 | Ohba |

FOREIGN PATENT DOCUMENTS

| | | |
|---|---|---|
| JP | 2001-283250 A | 10/2001 |
| JP | 2002-042165 A | 2/2002 |
| JP | 2004-102900 A | 4/2004 |
| JP | 2006127412 A | 5/2006 |
| TW | 477951 | 3/2002 |
| TW | I258381 B | 7/2006 |

OTHER PUBLICATIONS

Jonathan Cohen, et al., Appearance-Preserving Simplification, proceedings of the 25th Annual Conference on Computer Graphics and Interactive Techniques, 1998, pp. 115-112, XP-002553647.

European Search Report corresponding to EP Application No. 07806218.9, dated Nov. 24, 2009.

Koichi Onoue, et al., "A Rendering Method on Desert Scenes of Dunes with Wind-Ripples," The Transactions of the Institute of Electronics, Information and Communication Engineers, Feb. 1, 2003, pp. 282-289, vol. J86-D-II, No. 2.

* cited by examiner

| DISTANCE RANGE | COMBINATION RATIO |
|---|---|
| $D1 \leqq d < D2$ | 0.8 |
| $D2 \leqq d < D3$ | 0.6 |
| $D3 \leqq d < D4$ | 0.4 |
| $D4 \leqq d < D5$ | 0.2 |

FIG.8
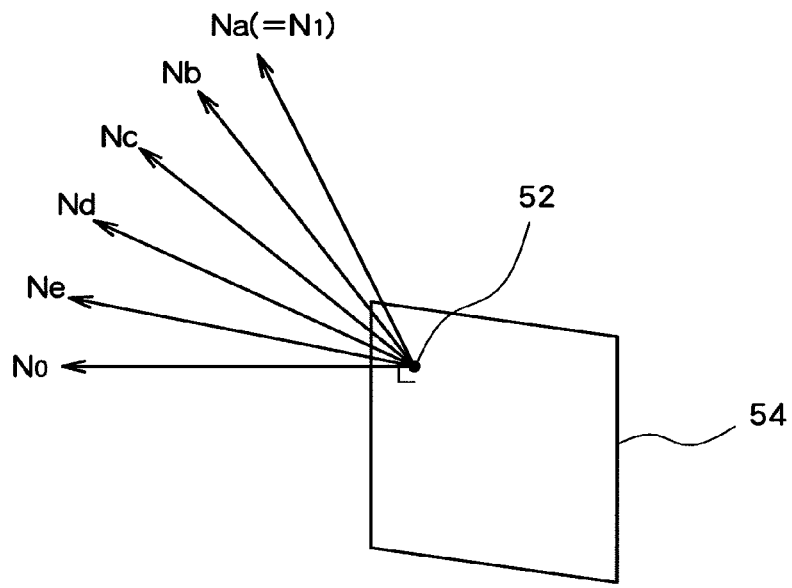
FIG.9
| DISTANCE RANGE | NORMAL MAP |
|---|---|
| $d < D1$ | NORMAL MAP A |
| $D1 \leq d < D2$ | NORMAL MAP B |
| $D2 \leq d < D3$ | NORMAL MAP C |
| $D3 \leq d < D4$ | NORMAL MAP D |
| $D4 \leq d < D5$ | NORMAL MAP E |
FIG.10
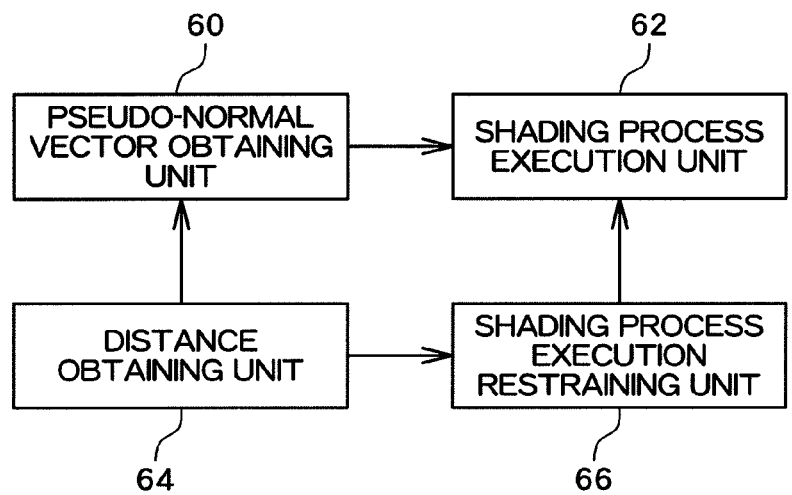

IMAGE PROCESSING DEVICE, CONTROL METHOD FOR IMAGE PROCESSING DEVICE AND INFORMATION RECORDING MEDIUM

TECHNICAL FIELD

The present invention relates to an image processing device, a control method for an image processing device, and an information recording medium.

BACKGROUND ART

In a three dimensional image process, a picture obtained by looking at a virtual three dimensional space where an object is placed from a given viewpoint is displayed for output. For the above, a technique referred to as bump mapping is available for expressing concave and convex features on a surface of an object. According to bump mapping, the normal vector of an object surface is modified according to the concave and convex feature so that shadow (light and shade) in accordance with the concave and convex feature can be imparted to the object surface. That is, use of bump mapping can impart shadow (light and shade) in accordance with concave and convex features to an object surface without strict expression of the concave and convex features on the object surface, using polygons.

According to typical bump mapping, a normal vector (hereinafter referred to as a "pseudo-normal vector") is hypothetically set on each of the pixels for a texture image to be mapped onto an object surface, and a shading process (a process for imparting shadow in accordance with concave and convex feature to an object surface) is carried out to the object surface, based on the pseudo-normal vectors set on the respective pixels. In the above, data referred to as a "normal map" is generally prepared as data indicating a pseudo-normal vector for each pixel of a texture image to be mapped onto the object surface. A normal map is data expressing a pseudo-normal vector set for each pixel of a texture image in the form of an RGB value. That is, a normal map is data expressing a WX axial direction component in the virtual three dimensional space (or a space comprising the WX, WY, and WZ axes) in the form of an R (red) value, a WY axial direction component in the form of a G (green) value, and a WZ axial direction component in the form of a B (blue) value. FIG. 12 is a diagram outlining the shading process. In the shading process, in rendering a polygon 54 which forms an object, the brightness of each pixel 52 is determined based on the pseudo-normal vector N of the pixel 52. More specifically, the brightness of each image 52 is determined such that when the angle θ formed by the light source direction vector L indicating the direction from the pixel 52 to the light source 50 and the pseudo-normal vector N of the pixel 52 is smaller, higher brightness results for the pixel 52, and when the angle θ is larger, lower brightness results for the pixel 52. This arrangement can impart fine shading on an object surface.

Patent Document 1: JP2001-283250A
Patent Document 2: JP2004-102900A

DISCLOSURE OF THE INVENTION

Problems to be Solved by the Invention

Although the bump mapping is a useful technique for imparting shade in accordance with concave and convex features on an object surface, using fewer polygons, strict application of the technique results in significant load in image processing. Thus, application of bump mapping to an object which will appear only small on a screen is not practicable. This leads to an idea that application of bump mapping to an object located away from the viewpoint by a distance equal to or longer than a predetermined reference distance be restrained so that image processing load can be reduced. In such a case, however, because a state in which shade in accordance with concave and convex features is shown in a game screen image is switched to a state in which no such shade is shown in the game screen image, at the moment when a state in which the bump mapping is applied to an object is switched to a state in which the bump mapping is not applied, the user may be given sense of discomfort, or feel strange.

The present invention has been conceived in view of the above, and aims to provide an image processing device, a control method for an image processing device, and an information recording medium capable of achieving shade expression on an object surface while reducing image processing load, and of reducing sense of discomfort which the user may feel.

Means to Solving the Problems

In order to achieve the above described object, an image processing device according to the present invention is an image processing device for displaying an image showing a picture obtained by looking at a virtual three dimensional space where an object is placed from a given viewpoint, comprising pseudo-normal vector obtaining means for obtaining a pseudo-normal vector for each pixel of a texture image to be mapped onto a surface of the object; shading process execution means for executing a shading process for the surface of the object, based on the pseudo-normal vector obtained by the pseudo-normal vector obtaining means; distance obtaining means for obtaining a distance from the viewpoint to the object; and shading process execution restraining means for restraining execution of the shading process by the shading process execution means, based on the distance obtained by the distance obtaining means, wherein the pseudo-normal vector obtaining means includes means for storing information correlating the distance from the viewpoint with pseudo-normal vector information for obtaining the pseudo-normal vector for each pixel of the texture image, and means for obtaining the pseudo-normal vector for each pixel of the texture image, based on the pseudo-normal vector information correlated to the distance obtained by the distance obtaining means.

Also, a control method for an image processing device according to the present invention is a control method for an image processing device for displaying an image showing a picture obtained by looking at a virtual three dimensional space where an object is placed from a given viewpoint, comprising a pseudo-normal vector obtaining step of obtaining a pseudo-normal vector for each pixel of a texture image to be mapped onto a surface of the object; a shading process execution step of executing a shading process for the surface of the object, based on the pseudo-normal vector obtained at the pseudo-normal vector obtaining step; a distance obtaining step of obtaining a distance from the viewpoint to the object; and a shading process execution restraining step of restraining execution of the shading process at the shading process execution step, based on the distance obtained at the distance obtaining step, wherein the pseudo-normal vector obtaining step includes a pseudo-normal vector information reading step of reading, from means for storing information correlating the distance from the viewpoint with pseudo-normal vector information for obtaining the pseudo-normal vector for each pixel of the texture image, the pseudo-normal vector information correlated to the distance obtained at the distance obtaining step, and a step of obtaining the pseudo-normal vector for each pixel of the texture image, based on the pseudo-normal vector information read at the pseudo-normal vector information reading step.

Also, a program according to the present invention is a program for causing a computer, including a consumer game device, a portable game device, a commercial game device, a portable phone, a personal digital assistant (PDA), a personal computer, and the like, to function as an image processing device for displaying an image showing a picture obtained by looking at a virtual three dimensional space where an object is placed from a given viewpoint, the program causing the computer to function as pseudo-normal vector obtaining means for obtaining a pseudo-normal vector for each pixel of a texture image to be mapped onto a surface of the object; shading process execution means for executing a shading process for the surface of the object, based on the pseudo-normal vector obtained by the pseudo-normal vector obtaining means; distance obtaining means for obtaining a distance from the viewpoint to the object; and shading process execution restraining means for restraining execution of the shading process by the shading process execution means, based on the distance obtained by the distance obtaining means, wherein the pseudo-normal vector obtaining means includes means for storing information correlating the distance from the viewpoint with pseudo-normal vector information for obtaining the pseudo-normal vector for each pixel of the texture image, and means for obtaining the pseudo-normal vector for each pixel of the texture image, based on the pseudo-normal vector information correlated to the distance obtained by the distance obtaining means.

Also, an information recording medium according to the present invention is a computer readable information recording medium recording the above described program. Also, a program distribution device according to the present invention is a program distribution device having an information recording medium recording the above described program and reading the program from the information recording medium and distributing. Also, a program distribution method according to the present invention is a program distribution method for reading the above described program from an information recording medium recording the program, and distributing it.

The present invention relates to an image processing device for displaying an image showing a picture obtained by looking at a virtual three dimensional space where an object is placed from a given viewpoint. According to the present invention, a pseudo-normal vector for each pixel of a texture image to be mapped onto a surface of the object is obtained. Then, a shading process is executed for a surface of the object, based on the pseudo-normal vector obtained. Also, according to the present invention, the distance from the viewpoint to the object is obtained. Then, execution of the shading process to the surface of the object is restrained based on the distance obtained. According to the present invention, in particular, information correlating the distance from the viewpoint with pseudo-normal vector information for obtaining a pseudo-normal vector for each pixel of the texture image is stored. Then, a pseudo-normal vector for each pixel of the texture image is obtained based on the pseudo-normal vector information correlated to the distance obtained. According to the present invention, it is possible to realize shade expression on an object surface while reducing image processing load, and reduction of a sense of discomfort which the user may feel.

In one embodiment of the present invention, the shading process execution restraining means may include means for determining whether or not the distance obtained by the distance obtaining means is equal to or longer than a predetermined reference distance, and in the case where the distance obtained by the distance obtaining means is equal to or longer than the reference distance, restrain execution of the shading process by the shading process execution means, and the pseudo-normal vector information may be set such that, as the distance obtained by the distance obtaining means becomes closer to the reference distance, an inclination angle of the pseudo-normal vector for each pixel of the texture image relative to a normal vector of the surface of the object becomes smaller.

Also, in another embodiment of the present invention, the pseudo-normal vector obtaining means may include means for storing information indicating a basic pseudo-normal vector for each pixel of the texture image, the pseudo-normal vector information may be information indicating a combination ratio for the basic pseudo-normal vector and the normal vector of the surface of the object, and the pseudo-normal vector obtaining means may obtain the pseudo-normal vector for each pixel of the texture image by combining the basic pseudo-normal vector of the pixel and the normal vector of the surface of the object, based on the combination ratio correlated to the distance obtained by the distance obtaining means.

Also, in still another embodiment of the present invention, the pseudo-normal vector information may be information indicating the pseudo-normal vector for each pixel of the texture image, and the pseudo-normal vector obtaining means may obtain the pseudo-normal vector for each pixel of the texture image, indicated by the pseudo-normal vector information correlated to the distance obtained by the distance obtaining means.

BRIEF DESCRIPTION OF THE DRAWINGS

FIG. 8 is a diagram illustrating the concept of a process to be carried out in the game device;

FIG. 9 is a diagram showing one example of a normal map table;

FIG. 10 is a functional block diagram of the game device according to this embodiment;

BEST MODE FOR CARRYING OUT THE INVENTION

In the following, one example of an embodiment of the present invention will be described in detail with reference to the accompanying drawings. Here, an example in which the present invention is applied to a game device which is one embodiment of an image processing device will be described. Note that the present invention is applicable to an image processing device other than a game device.

Figure 1:
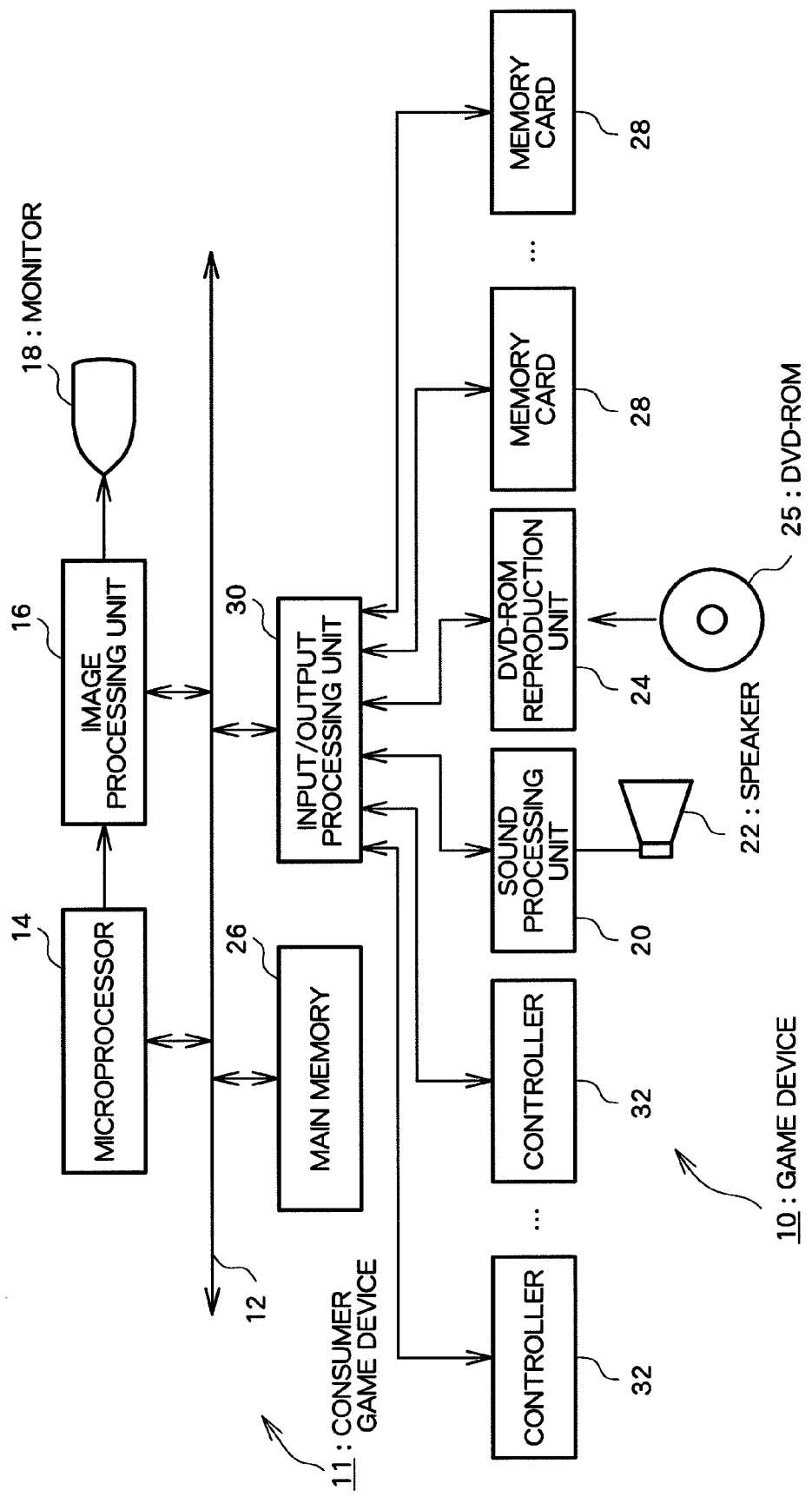
FIG. 1 is a diagram showing a hardware structure of a game device according to this embodiment.

FIG. 1 is a diagram showing a structure of a game device according to an embodiment of the present invention. The shown game device 10 comprises a consumer game device 11 having a DVD-ROM 25 and a memory card 28, or information storage media, mounted thereto and a monitor 18 and a speaker 22 connected thereto. For example, the monitor 18 may be a home-use television set receiver, and the speaker 22 may be a built-in speaker of the home-use television set receiver.

The consumer game device 11 is a publicly known computer game system comprising a bus 12, a microprocessor 14, an image processing unit 16, a sound processing unit 20, a DVD-ROM reproduction unit 24, a main memory 26, an input/output processing unit 30, and a controller 32. The respective structural elements other than the controller 32 are accommodated in an enclosure.

The bus 12 is used for exchanging an address and/or data among the respective units of the consumer game device 11. The microprocessor 14, image processing unit 16, main memory 26, and input/output processing unit 30 are mutually connected via the bus 12 for data exchange.

The microprocessor 14 controls the respective units of the consumer game device 11, based on an operating system stored in a ROM (not shown), a game program and game data read from the DVD-ROM 25 and/or memory card 28. The main memory 26 comprises, e.g., a RAM, into which a game program and/or game data read from the DVD-ROM 25 and/or memory card 28 is written as required. The main memory 26 is used also as a working memory of the microprocessor 14.

The image processing unit 16 comprises a VRAM, and receives image data sent from the microprocessor 14 and renders a game screen image into the VRAM. Further, the image processing unit 16 converts the content of the game screen image into a predetermined video signal, and outputs to the monitor 18 at a predetermined time. That is, the image processing unit 16 receives, from the microprocessor 14, the vertex coordinates, vertex color information (R, G, B values), texture coordinates, an alpha value, and the like of each polygon in the viewpoint coordinate system and then, using the information, writes the color information, Z value (depth information), alpha value, and the like for each pixel of a display image into a display buffer in the VRAM. In the above, a texture image is written beforehand in the VRAM and an area in the texture image, the area being specified by the texture coordinates, is mapped (attached) to a polygon specified by the vertex coordinates corresponding to the texture coordinates. The thus produced display image is output to the monitor 18 at a predetermined time.

The input/output processing unit 30 is an interface via which the microprocessor 14 accesses the sound processing unit 20, DVD-ROM reproduction unit 24, memory card 28, and controller 32. The sound processing unit 20, DVD-ROM reproduction unit 24, memory card 28, and controller 32 are connected to the input/output processing unit 30.

The sound processing unit 20 comprises a sound buffer, and reproduces various sound data, such as game music, game sound effect, a message, and the like, having been read from the DVD-ROM 25 and stored in the sound buffer, and outputs via the speaker 22.

The DVD-ROM reproduction unit 24 reads a game program and game data recorded in the DVD-ROM 25 according to instructions from the microprocessor 14. Note that although the DVD-ROM 25 is used here to provide a game program and game data to the consumer game device 11, any other information recording medium, such as a CD-ROM, a ROM card, and the like, may be used instead. Alternatively, a game program and game data may be provided via a data communication network, such as the Internet and the like, from a remote place to the consumer game device 11.

The memory card 28 comprises a nonvolatile memory (e.g., EEPROM, and the like). The consumer game device 11 has a plurality of memory card slots defined therein so that a plurality of memory cards 28 can be mounted at the same time. The memory card 28 can be removed from the memory card slot and is used to store various game data, such as saved data and the like.

The controller 32 is a general purpose operation input means for use by a player to input various game operations. The input/output processing unit 30 scans the states of the respective units of the controller 32 every constant period (e.g., every $\frac{1}{60}^{th}$ of a second) and sends an operation signal indicating the scanning result to the microprocessor 14 via the bus 12. The microprocessor 14 determines the game operation carried out by the player, based on the operation signal. The consumer game device 11 is formed adapted to connection to a plurality of controllers 32 so that the microprocessor 14 controls a game, based on operation signals input from the respective controllers 32.

In the following, a technique for enabling, in a game device 10 having the above described structure, shade expression on an object surface while reducing image processing load, and reducing a sense of discomfort which the user may feel, will be described. Here, an example of shade expression on a uniform worn by a player character playing in a soccer game will be described.

Figures 2, 3:
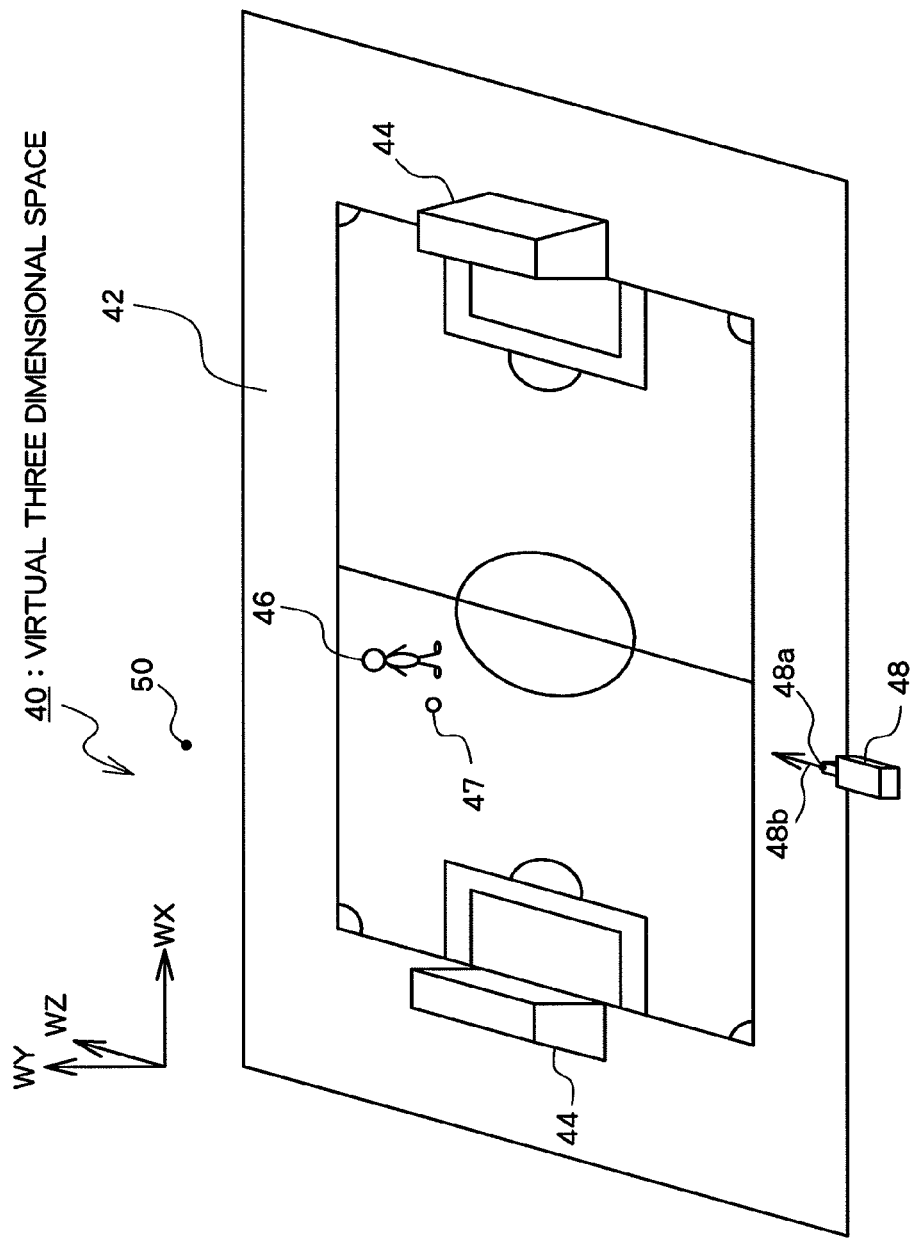
FIG. 2 is a diagram showing one example of a virtual three dimensional space.
FIG. 3 is a diagram showing one example of a combination ratio table.

Initially, a virtual three dimensional space created in the main memory 26 will be described. FIG. 2 is a diagram showing one example of a virtual three dimensional space. As shown in FIG. 2, a field object 42 representing a soccer field and goal objects 44 representing goals are placed in the virtual three dimensional space 40 so that a place for a soccer match is set. A player object 46 representing a soccer player and a ball object 47 representing a soccer ball are placed on the field object 42. A texture image representing, e.g., a uniform is mapped on the player object 46. Twenty two player objects 46, though not shown in FIG. 2, are placed on the field object 42. Each of the objects placed in the virtual three dimensional space 40 is formed using one or more polygons.

A virtual camera 48 (a viewpoint 48a and a viewing direction 48b) is set in the virtual three dimensional space 40. The virtual camera 48 moves according to the movement of, e.g., the ball object 47. A game screen image showing a picture obtained by looking at the virtual three dimensional space 40 from the virtual camera 48 is shown on the monitor 18. That is, a picture obtained by looking at the virtual three dimensional space 40 from the viewpoint 48a in the viewing direction 48b is displayed as a game screen image. A player operates the controller 32, while looking at the game screen image, thereby issuing a motion instruction with respect to, e.g., an operation target player object 46.

A light source 50 is also set in the virtual three dimensional space 40. A picture in which shade is formed on the uniform of the player object 46 due to the light source 50 and shadows of the goal object 44, player object 46, and ball object 47 are formed on the field object 42 due to the light source 50 are shown in the game screen image.

In the following, data stored in the game device 10 will be described.

In the main memory 26, information indicating the positions and postures of the respective player objects 46 and ball object 47 placed in the virtual three dimensional space 40 are stored. In addition, information indicating the position (viewpoint 48a) and posture (viewing direction 48b) of the virtual camera 48 set in the virtual three dimensional space 40 and information indicating the position of the light source 50 are also stored in the main memory 26.

In the DVD-ROM 25, model data indicating the shape of each object placed in the virtual three dimensional space 40 and texture image to be mapped onto a respective object are stored. For example, model data indicating the shape of each player object 46 and texture image representing the uniform of the player object 46 (hereinafter referred to as a "uniform texture image") are stored.

A normal map which is created corresponding to a uniform texture image is also stored in the DVD-ROM 25. The normal map is data expressing, in the form of an RGB value, a pseudo-normal vector set for each pixel of a uniform texture image. Note that a pseudo-normal vector of each pixel is normalized to a unit vector (a vector having a length of one). Note that a pseudo-normal vector of each pixel held in a normal map is hereinafter referred to as a "basic pseudo-normal vector".

A combination ratio table is also stored in the DVD-ROM 25. FIG. 3 shows one example of a combination ratio table. As shown in FIG. 3, the combination ratio table is data correlating a distance range with a combination ratio. The combination ratio is a combination ratio for a basic pseudo-normal vector to be adopted when combining the basic pseudo-normal vector and the normal vector of a polygon on which a uniform texture image is to be mapped, as will be described later (see S305 in FIG. 6 and FIG. 7), taking a value equal to or larger than 0 and equal to or smaller than 1. For example, a combination ratio "0.6" means that a vector obtained by multiplying a basic pseudo-reference vector by 0.6 is combined with a vector obtained by multiplying the normal vector of a plane onto which a uniform texture image is to be mapped by 0.4 (=1.0−0.6).

Figure 4:
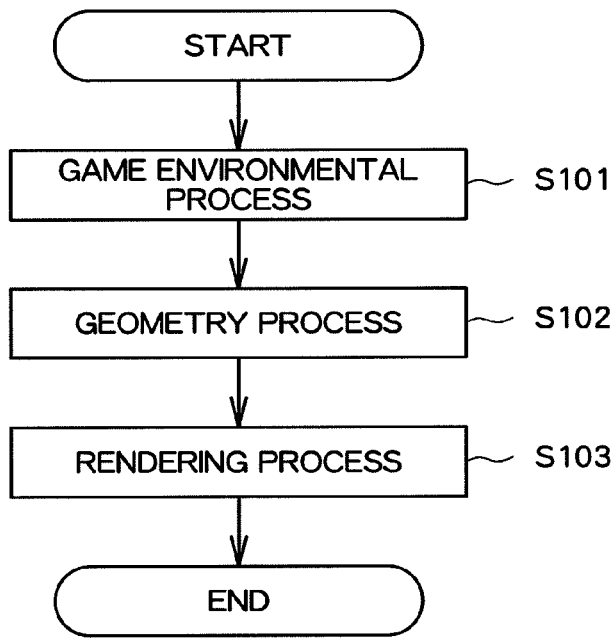
FIG. 4 is a flowchart of a process to be carried out in the game device.

In the following, a process to be carried out in the game device 10 to produce a game screen image will be described. FIG. 4 is a flowchart mainly showing those related to the present invention among processes to be carried out in the game device 10 every predetermined period of time (e.g., $\frac{1}{60}^{th}$ of a second). This process is realized by executing a program read from the DVD-ROM 25 in the game device 10.

As shown in FIG. 4, the game device 10 initially carries out a game environment process (S101). In the game environment process, the position and posture of each object placed in the virtual three dimensional space 40 is calculated. For example, the position and/or posture of the operation target player object 46 is calculated based on an operation signal input from the controller 32, and the position and posture information of each object stored in the main memory 26 is updated based on the calculated result. In the game environment process, the viewpoint 48a, viewing direction 48b, and viewing angle are determined, and a viewing field range is calculated. An object outside the viewing field range is excluded from the targets of a subsequent process.

Subsequently, the game device 10 carries out a geometry process (S102). In the geometry process, coordinates in a world coordinate system are converted to those in a viewpoint coordinate system. The world coordinate system refers to a coordinate system involving the WX, WY, and WZ axes shown in FIG. 2, while the viewpoint coordinate system is a coordinate system having the viewpoint 48a as the origin, the viewing direction 48b as the Z direction, the horizontal direction as the X direction, and the vertical direction as the Y direction. A clipping process is also carried out in the geometry process.

Subsequently, the game device 10 carries out a rendering process (S103). In the rendering process, a game screen image is rendered into a display buffer in the VRAM, based on the coordinates, color information, and alpha value of each vertex of each object in the viewing field range, a texture image to be mapped onto a surface of the object in the viewing field range, and a normal map corresponding to the texture image.

Figure 5:
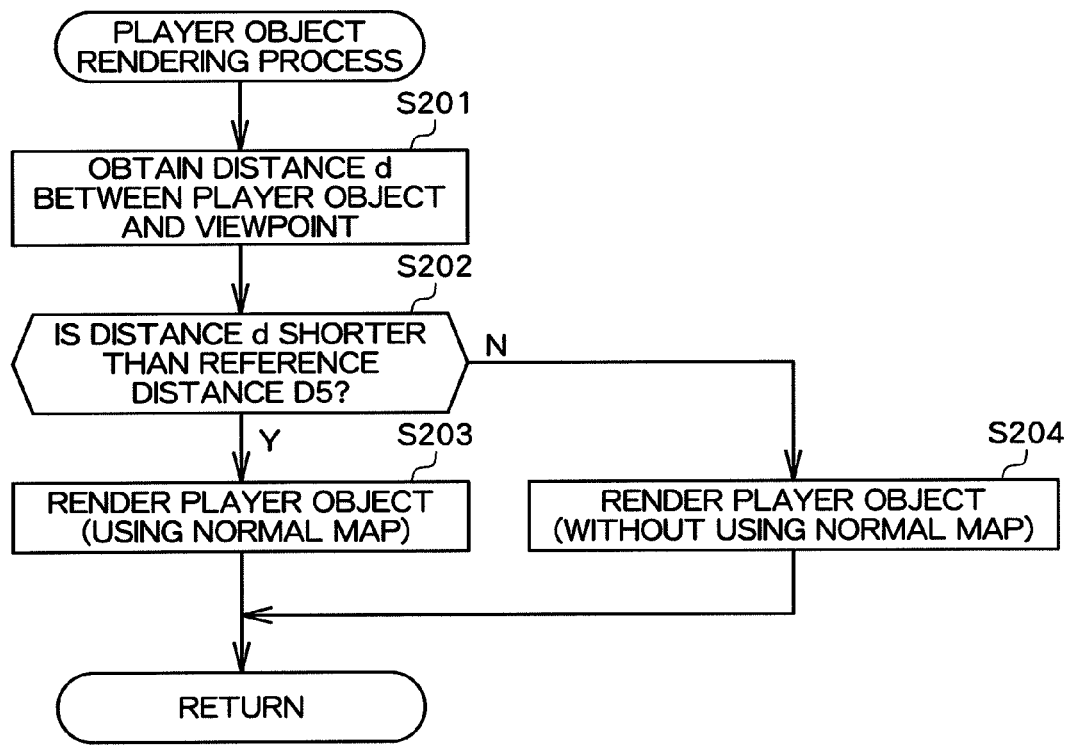
FIG. 5 is a flowchart of a process to be carried out in the game device.

In the following, a process for rendering the player object 46 in the entire rendering process will be described. FIG. 5 is a flowchart of this process.

As shown in FIG. 5, the game device 10 calculates the distance d (a distance in the virtual three dimensional space 40) between a representative point of the player object 46 and the viewpoint 48a (S201). This distance d is calculated based on the position information of the player object 46 and the virtual camera 48, stored in the main memory 26. The game device 10 then determines whether or not the distance d is shorter than a predetermined reference distance D5 (see FIG. 3) (S202).

For a distance d shorter than the reference distance D5, the game device 10 renders the player object 46 using a normal map (S203). In this case, the shading process is carried out for the uniform portion of the player object 46, based on the pseudo-normal vectors of the respective pixels for a uniform texture image. That is, fine shading is applied to the uniform of the player object 46.

Figure 6:
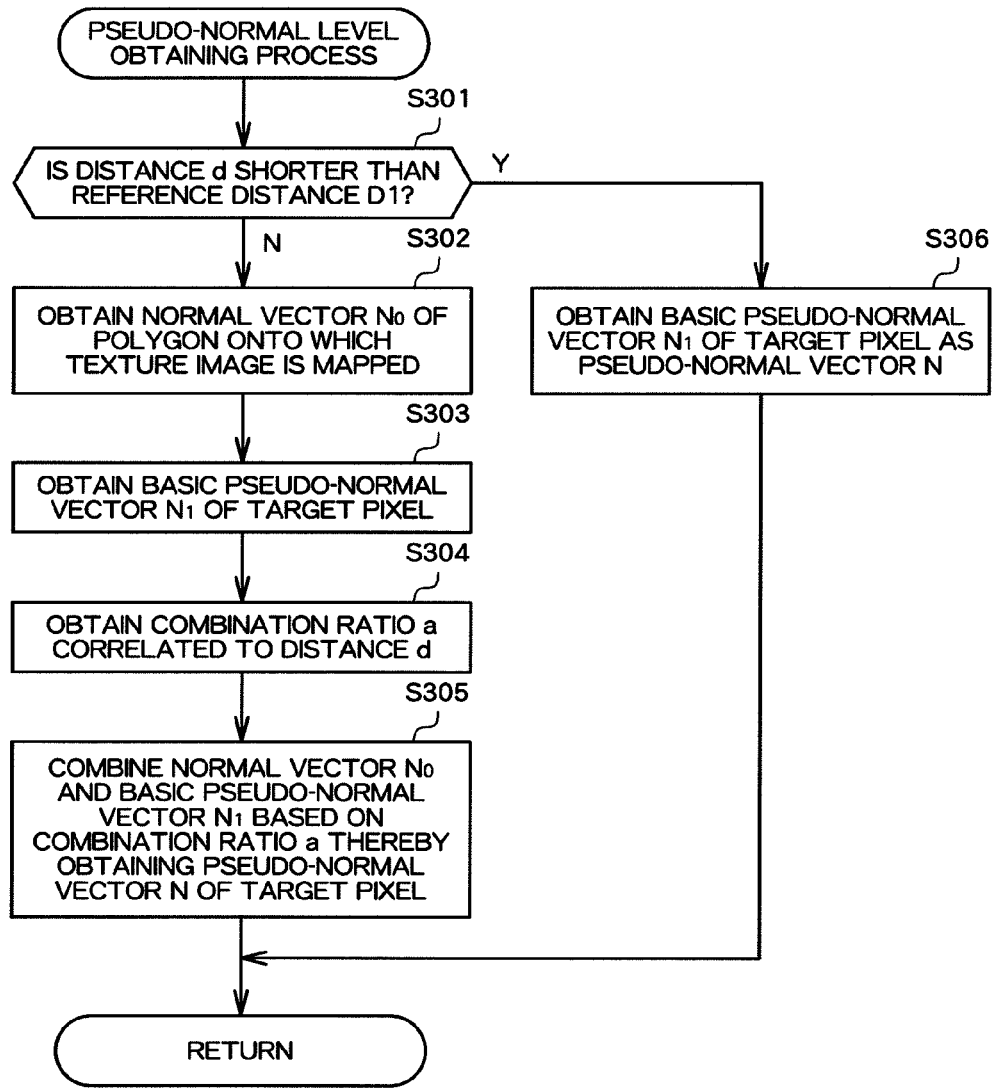
FIG. 6 is a flowchart of a process to be carried out in the game device.
Figure 7:
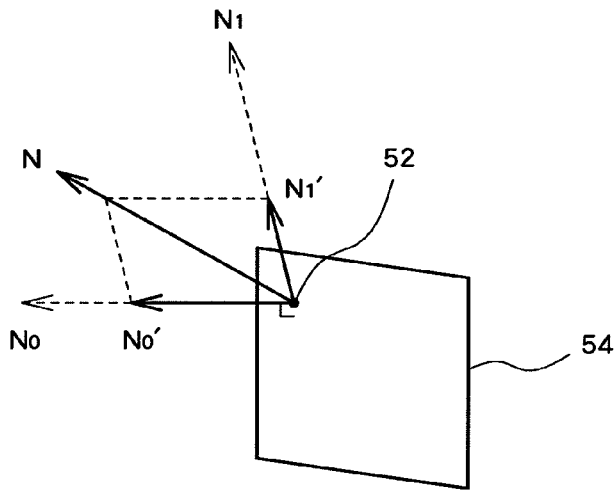
FIG. 7 is a diagram illustrating the concept of a process to be carried out in the game device.

At S203, the game device 10 obtains a pseudo-normal vector for each pixel of the uniform texture image as follows. FIG. 6 is a flowchart of a process for obtaining a pseudo-normal vector for each pixel of a uniform texture image; FIG. 7 is a diagram for explaining the outline of this process.

As shown in FIG. 6, to obtain a pseudo-normal vector for one (a target pixel) of the pixels 52 of a uniform texture image, the game device 10 initially determines whether or not the distance d is shorter than a predetermined reference distance D1 (see FIG. 3) (S301), in which the distance d is obtained at S201 in FIG. 5.

For a distance d equal to or longer than the reference distance D1 (that is, a distance d not shorter than the reference distance D1), the game device 10 obtains the normal vector $N_0$ of a polygon 54 onto which the uniform texture image is to be mapped (S302). Further, the game device 10 obtains the basic pseudo-normal vector $N_1$ of the pixel 52 from a normal map corresponding to the uniform texture image (S303). Still further, the game device 10 obtains the combination ratio a correlated to the distance range to which the distance d belongs from the combination ratio table (S304). Then, the game device 10 combines the normal vector $N_0$ and basic pseudo-normal vector $N_1$ based on the combination ratio a, thereby calculating the pseudo-normal vector N of the pixel 52 (S305). More specifically, as shown by the expression (1) below, the game device 10 obtains the vector of the sum of the vector $N_0'$ obtained by multiplying the normal vector $N_0$ by a factor (1−a) and the vector $N_1'$ obtained by multiplying the basic pseudo-normal vector $N_1$ by a factor (a), and normalizes the resultant vector to a unit vector, thereby obtaining the pseudo-normal vector N.

[Expression 1]

$$\vec{N} = (1-a)\cdot\vec{N}_0 + a\cdot\vec{N}_1 \quad (1)$$

On the other hand, for a distance d shorter than the reference distance D1, the game device 10 obtains the basic pseudo-normal vector $N_1$ of the pixel 52 as the pseudo-normal vector N of the pixel 52 from the normal map corresponding to the uniform texture image (S306).

FIG. 8 is a diagram for explaining the pseudo-normal vector N obtained as described above. In FIG. 8, the pseudo-normal vector Na indicates a pseudo-normal vector N with respect to a distance d shorter than the reference distance D1. In this case, the pseudo-normal vector Na of the pixel 52 is equal to the basic pseudo-normal vector $N_1$ of the pixel 52 (see S306 in FIG. 6). The pseudo-normal vector Nb indicates a pseudo-normal vector N with respect to a distance d equal to or longer than the reference distance D1 and shorter than the reference distance D2. Similarly, the pseudo-normal vector Nc indicates a pseudo-normal vector N with respect to the distance d equal to or longer than the reference distance D2 and shorter than the reference distance D3. The pseudo-normal vector Nd indicates a pseudo-normal vector N with respect to the distance d equal to or longer than the reference distance D3 and shorter than the reference distance D4. The pseudo-normal vector Ne indicates a pseudo-normal vector N with respect to the distance d equal to or longer than the reference distance D4 and shorter than the reference distance D5. As shown in FIG. 8, in the game device 10, as the distance d between the player object 46 and virtual camera 48 becomes closer to the reference distance D5, the angle formed by the normal vector $N_0$ of a polygon 54 onto which the uniform texture image is mapped and the pseudo-normal vector N of the pixel 52 becomes smaller.

Figure 12:
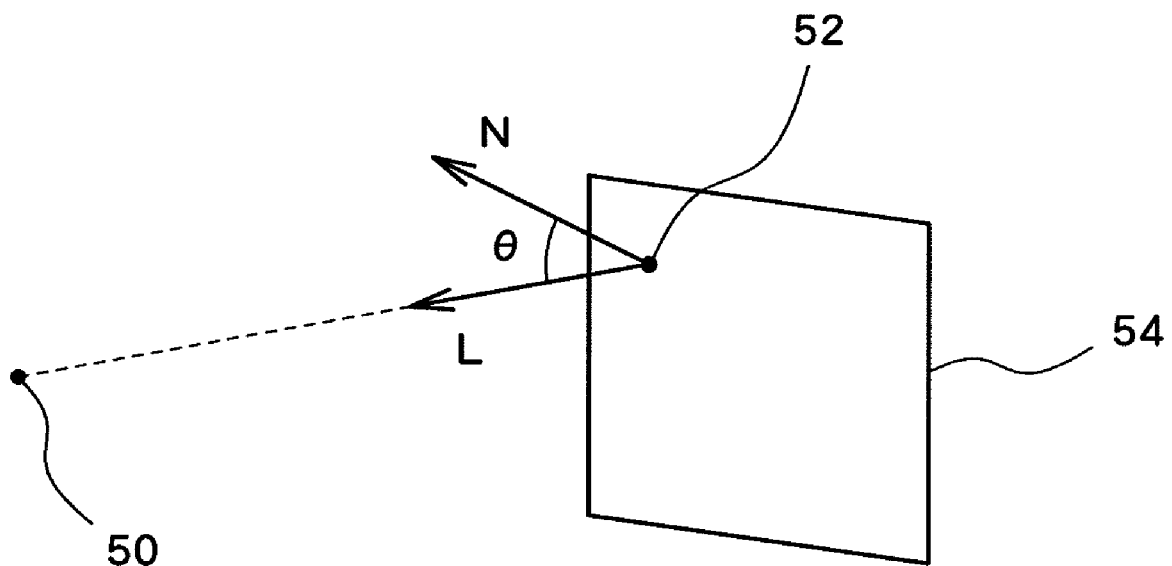
FIG. 12 is a diagram illustrating concept of a shading process using a normal map.

At S203, the game device 10 determines the brightness of each pixel related to the uniform portion of the player object 46, based on the pseudo-normal vector N obtained as described above. That is, as shown in FIG. 12, the brightness of each pixel 52 is determined such that when the angle $\theta$ formed by the light source direction vector L indicating the direction from the pixel 52 to the light source 50 and the pseudo-normal vector N of the pixel 52 is smaller, higher brightness of the pixel 52 results, and when the angle $\theta$ is larger, lower brightness of the pixel 52 results. For example, the game device 10 calculates the inner product value of the light source direction vector L and pseudo-normal vector N, and then calculates color information about the pixel, based on the inner product value.

On the other hand, when the distance d is determined at S202 to be equal to or longer than the reference distance D5, the game device 10 renders the player object 46 using no normal map (S204). In this case, the brightness of each pixel related to the uniform portion of the player object 46 is determined based on the normal vector (the normal vector $N_0$ shown in FIG. 7) of a polygon onto which the uniform texture image is to be mapped and the light source direction vector indicating the direction from the polygon to the light source 50. That is, in this case, as constant brightness is set on the respective pixels, fineness of the shade expressed on the uniform portion of the player object 46 is resultantly inferior to that when the process at S203 is carried out, though smaller processing load is resulted, compared to that at S203, as brightness is not calculated for every pixel at S204.

As described above, in the game device 10, when the distance between the player object 46 and virtual camera 48 is equal to or longer than the predetermined reference distance D5, execution of the shading process using a normal map with respect to the uniform portion of the player object 46 is restrained, whereby shade expression on the uniform portion of the player object 46 is restricted. Meanwhile, when the distance between the player object 46 and virtual camera 48 is relatively longer, it will not be a problem on appearance even if shade on the uniform portion of the player object 46 is not finely expressed because the player object 46 appears relatively small in the game screen image. Regarding this point, when the distance between the player object 46 and virtual camera 48 is relatively long, the game device 10 restricts shade expression on the uniform portion of the player object 46 so that processing load in rendering a game screen image is reduced.

In the game device 10, in the case where the shading process using a normal map is carried out on the uniform portion of the player object 46, the pseudo-normal vector N for each pixel of a uniform texture image will change based on the distance between the player object 46 and virtual camera 48. Accordingly, the state in which shade in accordance with concave and convex features is finely expressed on the uniform portion of the player object 46 shown in the game screen image is switched to a state in which no such shade is shown at the moment when the state in which the shading process using a normal map is carried out on the uniform portion of the player object 46 is switched to a state in which execution of such a shading process is restrained, and this may cause the user to feel a sense of discomfort. Regarding this point, when the distance between the player object 46 and virtual camera 48 is equal to or longer than the predetermined reference distance D5, the game device 10 restrains execution of the shading process using a normal map with respect to the uniform portion of the player object 46. In this case, the brightness of each pixel related to the uniform portion of the player object 46 is determined based on the normal vector $N_0$ of a polygon onto which the uniform texture image is mapped. Meanwhile, when the distance between the player object 46 and virtual camera 48 is shorter than the predetermined reference distance D5, that is, when the shading process using a normal map is carried out on the uniform portion of the player object 46, the inclination angle of the pseudo-normal vector N (Na to Ne) of each pixel 52 relative to the normal vector $N_0$ of the polygon 54 onto which the uniform texture image is to be mapped becomes smaller as the distance between the player object 46 and virtual camera 48 becomes closer to the reference distance D5, as shown in, e.g., FIG. 8. Accordingly, in the game device 10, in switching the state in which the shading process using a normal map is carried out on the uniform portion of the player object 46 to a state in which execution of the shading process is restrained, execution of the shading process using a normal map with respect to the uniform portion of the player object 46 is gradually restricted so that the user is not caused to feel a sense of discomfort.

It should be noted that the game device 10 may store one or more operational expressions for calculating a combination ratio, based on the distance between the player object 46 and virtual camera 48, instead of storing the combination ratio table shown in FIG. 3, so that the combination ratio a is calculated using the operational expression at S304 in FIG. 6.

Alternatively, the game device 10 may store a normal map table, such as is shown in FIG. 9, for example, instead of storing the combination ratio table shown in FIG. 3. That is, pseudo-normal vectors N of the respective pixels for a uniform texture image may be calculated beforehand with respect to respective cases where the distance between the player object 46 and virtual camera 48 belongs to respective distance ranges, and in the game device 10, a normal map indicating a calculation result may be stored so as to be correlated to a respective distance range. Note that similar to the combination ratio table shown in FIG. 3, the normal map table and normal maps A to E may be set such that the inclination angle of the pseudo-normal vector N (Na to Ne) of each pixel 52 relative to the normal vector $N_0$ of a polygon 54 onto which a uniform texture image is to be mapped becomes smaller as the distance between the player object 46 and virtual camera 48 becomes closer to the above described reference distance D5, as shown in FIG. 8.

Note that according to an aspect in which either the combination ratio table shown in FIG. 3 or an operational expression for calculating a combination ratio based on the distance between the player object 46 and virtual camera 48 is stored, fewer normal maps needs to be stored beforehand, compared to an aspect in which the normal map table shown in FIG. 9 is stored. Consequently, the data amount related to shade expression on the uniform portion of the player object 46 can be reduced.

In the following, a function realized in the game device 10 will be described. FIG. 10 is a functional block diagram mainly showing functions related to the present invention, among the functions realized in the game device 10. As shown in FIG. 10, the game device 10 comprises, in terms of function, a pseudo-normal vector obtaining unit 60, a shading process execution unit 62, a distance obtaining unit 64, and a shading process execution restraining unit 66. These functions are realized by reading a program for carrying out the process shown in, for example, FIG. 4 to FIG. 6 from the DVD-ROM 25, and executing the read program in the game device 10.

[Distance Obtaining Unit]

The distance obtaining unit 64 is realized mainly using the microprocessor 14. The distance obtaining unit 64 obtains the distance from the virtual camera 48 (viewpoint 48a) to the player object 46.

[Pseudo-Normal Vector Obtaining Unit]

The pseudo-normal vector obtaining unit 60 is realized mainly using the microprocessor 14. The pseudo-normal vector obtaining unit 60 obtains a pseudo-normal vector hypothetically set for each pixel of a uniform texture image to be mapped onto a surface of the player object 46.

The pseudo-normal vector obtaining unit 60 stores information correlating the distance from the virtual camera 48 (viewpoint 48a) and pseudo-normal vector information. Pseudo-normal vector information is information for obtaining a pseudo-normal vector for each pixel of a uniform texture image, and is defined such that the inclination angle of a pseudo-normal vector for each pixel of a uniform texture image relative to the normal vector of a surface of the player object 46 (a polygon onto which the uniform texture image is to be mapped) becomes smaller as the distance obtained by the distance obtaining unit 64 becomes closer to the reference distance D5. The pseudo-normal vector obtaining unit 60 obtains pseudo-normal vector information correlated to the distance obtained by the distance obtaining unit 64, and then obtains the pseudo-normal vector based on the pseudo-normal vector information.

For example, the pseudo-normal vector obtaining unit 60 stores information indicating the basic pseudo-normal vector for each pixel of a uniform texture image. "Information indicating the basic pseudo-normal vector for each pixel of a uniform texture image" is, e.g., a normal map of a uniform texture image. The pseudo-normal vector obtaining unit 60 stores information correlating information indicating a combination ratio, for a basic pseudo-normal vector and the normal vector of a surface of the player object 46 (a polygon onto which the uniform texture image is to be mapped), with the distance from the virtual camera 48. In this case, the information indicating the combination ratio corresponds to "pseudo-normal vector information". "Information correlating information indicating a combination ratio with the distance from the virtual camera 48" may be table-type information or one or more operational expressions. Combination of table-type information and one or more operational expressions is similarly applicable. "Information correlating information indicating a combination ratio with the distance from the virtual camera 48" may be the combination ratio table shown in, e.g., FIG. 3 or an operational expression for calculating a combination ratio based on the distance from the virtual camera 48. Then, the pseudo-normal vector obtaining unit 60 obtains a pseudo-normal vector for each pixel of a uniform texture image by combining the basic pseudo-normal vector of the pixel and the normal vector of a surface of the player object 46 (a polygon onto which the uniform texture image is to be mapped) based on the combination ratio correlated to the distance obtained by the distance obtaining unit 64.

Alternatively, the pseudo-normal vector obtaining unit 60 may store information indicating a pseudo-normal vector for each pixel of a uniform texture image so as to be correlated to the distance from the virtual camera 48. "Information indicating a pseudo-normal vector for each pixel of a uniform texture image" is, e.g., a normal map. For example, the pseudo-normal vector obtaining unit 60 may store the normal map table shown in FIG. 9 together with the normal maps A to E. Then, the pseudo-normal vector obtaining unit 60 may obtain the normal map correlated to the distance obtained by the distance obtaining unit 64, and then obtain the pseudo-normal vector for each pixel of a uniform texture image, the pseudo-normal vector being indicated by the normal map.

[Shading Process Execution Unit]

The shading process execution unit 62 is realized mainly using the microprocessor 14 or image processing unit 16. The shading process execution unit 62 carries out a shading process for a surface (uniform portion) of the player object 46, based on the pseudo-normal vector obtained by the pseudo-normal vector obtaining unit 60.

[Shading Process Execution Restraining Unit]

The shading process execution restraining unit 66 is realized mainly using the microprocessor 14 or image processing unit 16. The shading process execution restraining unit 66 restrains execution of the shading process by the shading process execution unit 62, based on the distance obtained by the distance obtaining unit 64. For example, the shading process execution restraining unit 66 determines whether or not the distance obtained by the distance obtaining unit 64 is equal to or longer than the predetermined reference distance D5, and when the distance obtained by the distance obtaining unit 64 is determined to be equal to or longer than the reference distance D5, restrains execution of the shading process by the shading process execution unit 62.

As described above, according to the game device 10, it is possible to attain shade expression on the uniform portion of the player object 46 while reducing processing load in rendering a game screen image, and also to prevent the user from feeling a sense of discomfort.

Note that the present invention is not limited to the above-described embodiment.

Figure 11:
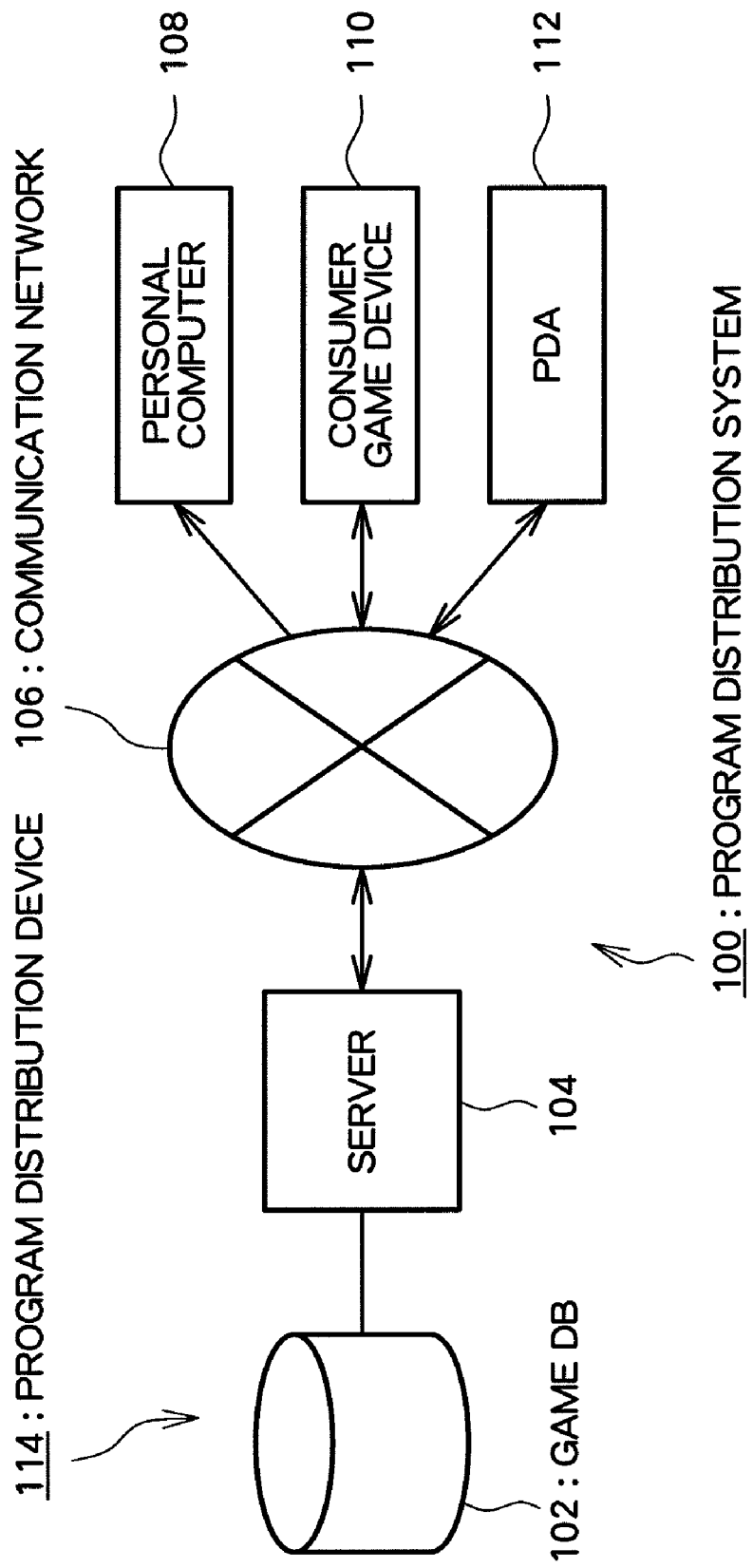
FIG. 11 is a diagram showing an overall structure of a program distribution system according to another embodiment of the present invention.

For example, although a program is supplied from the DVD-ROM 25, or an information recording medium, to the consumer game device 11 in the above description, the program may alternatively be distributed via a communication network to a home or the like. FIG. 11 is a diagram showing an overall structure of a program distribution system using a communication network. Referring to FIG. 11, a program distribution method according to the present invention will be described. As shown in FIG. 11, the program distribution system 100 comprises a game database 102, a server 104, a communication network 106, a personal computer 108, a consumer game device 110, and a PDA (personal digital assistant) 112, in which the game database 102 and the server 104 together constitute a program distribution device 114. The communication network 106 comprises, e.g., the Internet, a cable television network, and the like. In this system, a program having content identical to that stored in the DVD-ROM 25 is stored in the game database (an information recording medium) 102. When a demander requests game distribution, using the personal computer 108, consumer game device 110, PDA 112, or the like, the request is transmitted via the communication network 106 to the server 104. Then, the server 104, in response to the game distribution request, reads the program from the game database 102, and sends to the entity, such as the personal computer 108, consumer game device 110, PDA 112, or the like, having requested the game distribution. It should be noted that although a game is distributed here in response to a game distribution request, the server 104 may unidirectionally send a game. Also, distribution of all program components necessary to realize a game at once (collective distribution) is not always necessary, and distribution of only a component necessary for each aspect of the game (divided distribution) is applicable instead. With the above described game distribution via the communication network 106, the demander can readily obtain the program.

Also, for example, the present invention is applicable to a game device for carrying out a game other than a soccer game. Further, the present invention is applicable to an image processing device other than a game device.

What is claimed is:

1. An image processing device for displaying an image showing a picture obtained by looking at a virtual three dimensional space in which an object is placed from a given viewpoint, the image processing device comprising:
a central processing unit;
a pseudo-normal vector obtaining unit that obtains a pseudo-normal vector for each pixel of a texture image to be mapped onto a surface of the object;
a shading process execution unit that executes a shading process for the surface of the object, based on the pseudo-normal vector;
a distance obtaining unit that obtains a distance from the viewpoint to the object; and
a shading process execution restraining unit that restrains execution of the shading process, based on the distance from the viewpoint,
wherein
the pseudo-normal vector obtaining
unit obtains, from a storage that stores information correlating the distance from the viewpoint with pseudo-normal vector information for obtaining the pseudo-normal vector for each pixel of the texture image, the pseudo-normal vector information correlated to the obtained distance and
obtains the pseudo-normal vector for each pixel of the texture image, based on the pseudo-normal vector information correlated to the distance, and
wherein the shading process execution restraining unit determines whether or not the distance is equal to or longer than a reference distance, and in the case where the distance is equal to or longer than the reference distance, restrains execution of the shading process, and
the pseudo-normal vector information is set such that, as the distance obtained becomes closer to the reference distance, an inclination angle of the pseudo-normal vector for each pixel of the texture image relative to a normal vector of the surface of the object becomes smaller.

2. The image processing device according to claim 1, wherein
the pseudo-normal vector obtaining unit obtains, from a storage unit that stores information indicating a basic pseudo-normal vector for each pixel of the texture image, the information,
the pseudo-normal vector information is information indicating a combination ratio for the basic pseudo-normal vector and the normal vector of the surface of the object, and
the pseudo-normal vector obtaining unit obtains the pseudo-normal vector for each pixel of the texture image by combining the basic pseudo-normal vector of the pixel and the normal vector of the surface of the object, based on the combination ratio correlated to the distance obtained by the distance obtaining unit.

3. The image processing device according to claim 1, wherein
the pseudo-normal vector information is information indicating the pseudo-normal vector for each pixel of the texture image, and
the pseudo-normal vector obtaining unit obtains the pseudo-normal vector for each pixel of the texture image, indicated by the pseudo-normal vector information correlated to the distance obtained by the distance obtaining unit.

4. The image processing device according to claim 1, wherein
the pseudo-normal vector obtaining unit obtains, from a storage that stores information indicating a basic pseudo-normal vector for each pixel of the texture image, the information,
the pseudo-normal vector information is information indicating a combination ratio for the basic pseudo-normal vector and the normal vector of the surface of the object, and
the pseudo-normal vector obtaining unit obtains the pseudo-normal vector for each pixel of the texture image by combining the basic pseudo-normal vector of the pixel and the normal vector of the surface of the object, based on the combination ratio correlated to the distance obtained by the distance obtaining unit.

5. The image processing device according to claim 1, wherein
the pseudo-normal vector information is information indicating the pseudo-normal vector for each pixel of the texture image, and
the pseudo-normal vector obtaining unit obtains the pseudo-normal vector for each pixel of the texture image, indicated by the pseudo-normal vector information correlated to the distance obtained by the distance obtaining unit.

6. A control method for an image processing device for displaying an image showing a picture obtained by looking at a virtual three dimensional space in which an object is placed from a given viewpoint, the control method comprising:
obtaining a pseudo-normal vector for each pixel of a texture image to be mapped onto a surface of the object;
executing, by at least one central processing unit (CPU) of the image processing device, a shading process for the surface of the object, based on the pseudo-normal vector;
obtaining a distance from the viewpoint to the object; and
restraining execution of the shading process, based on the obtained distance, wherein obtaining the pseudo-normal vector includes:

reading, from a storage that stores information correlating the distance from the viewpoint with pseudo-normal vector information for obtaining the pseudo-normal vector for each pixel of the texture image, the pseudo-normal vector information correlated to the obtained distance, and obtaining the pseudo-normal vector for each pixel of the texture image, based on the read pseudo-normal vector information, and wherein restraining execution of the shading process comprises determining whether or not the distance is equal to or longer than a reference distance, and in the case where the distance is equal to or longer than the reference distance, restrains execution of the shading process, and the pseudo-normal vector information is set such that, as the distance obtained becomes closer to the reference distance, an inclination angle of the pseudo-normal vector for each pixel of the texture image relative to a normal vector of the surface of the object becomes smaller.

7. A non-transitory computer readable information recording medium recording a program for causing a computer to function as an image processing device for displaying an image showing a picture obtained by looking at a virtual three dimensional space in which an object is placed from a given viewpoint, the program causing the computer to function as:

a pseudo-normal vector obtaining unit that obtains a pseudo-normal vector for each pixel of a texture image to be mapped onto a surface of the object;

a shading process execution unit that executes a shading process to the surface of the object, based on the pseudo-normal vector;

a distance obtaining unit that obtains a distance from the viewpoint to the object; and a shading process execution restraining unit that restrains execution of the shading process by the shading process execution unit, based on the distance, wherein the pseudo-normal vector obtaining unit obtains, from a storage that stores information correlating the distance from the viewpoint with pseudo-normal vector information for obtaining the pseudo-normal vector for each pixel of the texture image, the pseudo-normal vector information correlated to the obtained distance and obtains the pseudo-normal vector for each pixel of the texture image, based on the pseudo-normal vector information correlated to the distance obtained by the distance obtaining unit, and wherein the shading process execution restraining unit determines whether or not the distance is equal to or longer than a reference distance, and in the case where the distance is equal to or longer than the reference distance, restrains execution of the shading process, and the pseudo-normal vector information is set such that, as the distance obtained becomes closer to the reference distance, an inclination angle of the pseudo-normal vector for each pixel of the texture image relative to a normal vector of the surface of the object becomes smaller.

8. An image processing device for displaying an image showing a picture obtained by looking at a virtual three dimensional space in which an object is placed from a given viewpoint, the image processing device comprising:

a central processing unit;

a distance obtaining unit that obtains a distance from the viewpoint to the object; and a shading process restraining unit that determines whether the distance is equal to or longer than a reference distance, and in the case where the distance is equal to or longer than the reference distance, restrains execution of a shading process of a surface of the object based on the distance from the viewpoint such that, as the distance from the viewpoint becomes closer to the reference distance, an inclination angle of a pseudo-normal vector for each pixel of a texture image relative to a normal vector of the surface of the object becomes smaller.

* * * * *